(12) United States Patent
Zhang et al.

(10) Patent No.: US 11,967,126 B2
(45) Date of Patent: Apr. 23, 2024

(54) COMPUTER IMPLEMENTED METHOD AND DEVICE FOR ANOMALY DETECTION

(71) Applicant: Robert Bosch GmbH, Stuttgart (DE)

(72) Inventors: Dan Zhang, Leonberg (DE); Robin Tibor Schirrmeister, Freiburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 685 days.

(21) Appl. No.: 17/138,465

(22) Filed: Dec. 30, 2020

(65) Prior Publication Data
US 2021/0233222 A1 Jul. 29, 2021

(30) Foreign Application Priority Data
Jan. 24, 2020 (EP) .................................... 20153553

(51) Int. Cl.
*G06V 10/44* (2022.01)
*G06N 20/00* (2019.01)
*G06T 7/00* (2017.01)

(52) U.S. Cl.
CPC ........... *G06V 10/446* (2022.01); *G06N 20/00* (2019.01); *G06T 7/0002* (2013.01);
(Continued)

(58) Field of Classification Search
None
See application file for complete search history.

(56) References Cited

U.S. PATENT DOCUMENTS

| 6,414,757 B1 * | 7/2002 | Salem | ................... | H04N 1/405 |
| | | | | 358/530 |
| 8,806,313 B1 * | 8/2014 | Yu | ......................... | G06F 11/076 |
| | | | | 714/755 |

(Continued)

OTHER PUBLICATIONS

Jingyuan Wang et al. "Multilevel Wavelet Decomposition Network for Interpretable Time Series Analysis", KDD 2018: 24th ACM SIGKDD International Conference on Knowledge Discovery & Data Mining, Aug. 19-23, 2018 (Year: 2018).*

(Continued)

*Primary Examiner* — Vu Le
*Assistant Examiner* — Charles C L Penny
(74) *Attorney, Agent, or Firm* — NORTON ROSE FULBRIGHT US LLP

(57) ABSTRACT

A device and a computer implemented method of anomaly detection, including processing a digital representation of a signal or image with a wavelet decomposition to generate a first, second, and third plurality of decomposed representations, processing a first decomposed representation of the third plurality of decomposed representations with a first generative model to determine a first likelihood, processing a second decomposed representation of the third plurality of decomposed representations with a second generative model to determine a second likelihood, processing a second decomposed representation of the second plurality of decomposed representations with a third generative model to determine a third likelihood, processing a second decomposed representation of the first plurality of decomposed representations with a fourth generative model to determine a fourth likelihood, detecting an anomaly when at least one of the first likelihood, the second likelihood, the third likelihood and the fourth likelihood meets a criterium for anomaly detection.

18 Claims, 4 Drawing Sheets

(52) U.S. Cl.
CPC ............... *G06T 2207/10024* (2013.01); *G06T 2207/20064* (2013.01); *G06T 2207/20076* (2013.01); *G06T 2207/20081* (2013.01); *G06T 2207/20084* (2013.01)

(56) References Cited

U.S. PATENT DOCUMENTS

| | | | | |
|---|---|---|---|---|
| 10,853,449 | B1* | 12/2020 | Nguyen | G16H 15/00 |
| 11,691,755 | B2* | 7/2023 | Gu | G05D 1/104 |
| | | | | 701/14 |
| 2003/0137704 | A1* | 7/2003 | Ferriere | G06T 3/4084 |
| | | | | 358/2.99 |
| 2021/0327563 | A1* | 10/2021 | He | G06V 10/462 |

OTHER PUBLICATIONS

Hauskrecht et al. "Evidence-based Anomaly Detection in Clinical Domains", AMIA 2007 Symposium Proceedings (Year: 2007).*

Brian E. Moore et al. "Chaotic Invariants of Lagrangian Particle Trajectories for Anomaly Detection in Crowded Scenes" 2010 IEEE Computer Society Conference on Computer Vision and Pattern Recognition (Year: 2010).*

J. Wang, S. Shao, Y. Bai, J. Deng and Y. Lin, "Multiscale Wavelet Graph AutoEncoder for Multivariate Time-Series Anomaly Detection," in IEEE Transactions on Instrumentation and Measurement, vol. 72, pp. 1-11, 2023, doi: 10.1109/TIM.2022.3223142 (Year: 2023).*

Puuska, et al.: "Anomaly-Based Network Intrusion Detection Using Wavelets and Adversarial Autoencoders", , SecITC 2018, LNCS 11359, Springer Nature CH, pp. 234-246, (2019), XP047501913.

Rui, et al.: "Online defect recognition of narrow overlap weld based on two-stage recognition model combining continuous wavelet transform and convolutional neural network", Computers in Industry, Elsevier, Amsterdam, NL, 112(22), (2019), pp. 1-11, XP085854832.

Yuan. et al.: "WaveletAE: A Wavelet-enhanced Autoencoder for Wind Turbine Blade Icing Detection", arxiv.org, Cornell University Library, (2019), pp. 1-9, XP081499045.

* cited by examiner

COMPUTER IMPLEMENTED METHOD AND DEVICE FOR ANOMALY DETECTION

CROSS REFERENCE

The present application claims the benefit under 35 U.S.C. § 119 of European Patent Application No. EP 20153553.1 filed on Jan. 24, 2020, which is expressly incorporated herein by reference in its entirety.

FIELD

The present invention relates to a method and device for anomaly detection.

BACKGROUND INFORMATION

Realistic real world natural signals can be captured by sensors and represented as digital representations thereof. Visual signals can be represented by digital images. Audible signals can be represented by digital audio or as images. A robust anomaly detection for digital representation of realistic natural signals like digital images or digital audio requires a method that works robustly across diverse settings.

SUMMARY

In accordance with example embodiments of the present invention, a robust anomaly detection achieved.

In accordance with an example embodiment of the present invention, the method of anomaly detection includes processing a digital representation of a signal or image with a wavelet decomposition to generate a first plurality of decomposed representations, processing a first decomposed representation of the first plurality of decomposed representations with a wavelet decomposition to generate a second plurality of decomposed representations, processing a first decomposed representation of the second plurality of decomposed representations with a wavelet decomposition to generate a third plurality of decomposed representations, processing a first decomposed representation of the third plurality of decomposed representations with a first generative model to determine a first likelihood, processing at least one second decomposed representation of the third plurality of decomposed representations with a second generative model to determine a second likelihood, processing at least one second decomposed representation of the second plurality of decomposed representations with a third generative model to determine a third likelihood, processing at least one second decomposed representation of the first plurality of decomposed representations with a fourth generative model to determine a fourth likelihood, detecting an anomaly when at least one of the first likelihood, the second likelihood, the third likelihood and the fourth likelihood meets a criterion for anomaly detection. This wavelet decomposition produces wavelet coefficients in three levels of scale. Generally a wavelet decomposition produces as many scales of wavelet coefficients an input resolution of the digital representation allows. For an input resolution of 8×8 this means log 2(8)=3 wavelet coefficient scales can be produced. For an input resolution of 32×32, log 2(32)=5 wavelet coefficient scales are available. Accordingly, not all of the available wavelet coefficient scales are used, when the wavelet decomposition produces wavelet coefficients in three levels of scale. The wavelet decomposition produces in one example images of different resolution. The first decomposed representation at each level corresponds to a digital image that is further decomposed for the next level of scale. Using a Haar Wavelet at least one second decomposed representations at each level correspond to a digital image defined by a horizontal, a vertical or a diagonal difference between pixels of a the digital representation or the first decomposed representation of a previous level of scale. Haar Wavelet is one example, more generally, other wavelet decompositions, such as Meyer-Wavelet or Morlet-Wavelet can be used as well. The same wavelet decomposition is used at all levels. The wavelet coefficients are analyzed independently in four models for detecting an anomaly if one of the models produces a likelihood that indicates an anomaly. The wavelet coefficients in each of the decompositions have a different resolution. Hence the accuracy and reliability may be significantly improved compared to analogy detection.

Preferably, the second generative model is conditioned on the first decomposed representation of the third plurality of decomposed representations and/or that the third generative model is either conditioned on the first decomposed representation of the third plurality of decomposed representations and on the at least one second decomposed representation of the third plurality of decomposed representations or is conditioned on a reconstructed representation that is reconstructed from the first decomposed representation of the third plurality of decomposed representations and the at least one second decomposed representation by inverse wavelet decomposition, and/or that the fourth generative model is either conditioned on the first decomposed representation of the third plurality of decomposed representations, the at least one second decomposed representation of the third plurality of decomposed representations and the at least one second decomposed representation of the second plurality of decomposed representations or is conditioned on a reconstructed representation that is reconstructed from the first decomposed representation of the third plurality of decomposed representations, the at least one second decomposed representation of the third plurality of decomposed representations and/or the at least one second decomposed representation of the second plurality of decomposed representations by at least one inverse wavelet decomposition. The conditioning improves the accuracy further.

In one aspect of the present invention, the criterion is met, when at least one of the first likelihood, the second likelihood, the third likelihood and the fourth likelihood is below a threshold. The likelihood for a normal image is assumed to be in a predetermined range. If the likelihood is outside the range, an abnormal image is detected.

In accordance with an example embodiment of the present invention, the method may include comparing the first likelihood to a first threshold, comparing the second likelihood to a second threshold, comparing the third likelihood to a third threshold, comparing the fourth likelihood to a fourth threshold. The threshold may be adjustable. Thus, a normal or abnormal image is easily detectable.

The threshold test may be performed independently and an anomaly may be detected if k likelihoods of a total of K likelihoods signify anomaly. For k=1 an anomaly is detected, in case one likelihood is out of a predefined normal range.

In one aspect of the present invention, the method comprises determining a sum depending on the first likelihood, the second likelihood, the third likelihood, and the fourth likelihood, comparing the sum to a threshold in a comparison and depending on the result of the comparison detecting the anomaly or not. Thus a normal or a abnormal signal or image is detected depending on the result of the comparison. This means, the anomaly is detected by evaluating whether the first likelihood, the second likelihood, the third likelihood and the forth likelihood together meet a criterion. The sum may be determined from the likelihoods directly. A variant for the sum may be a sum of likelihoods after a division of each likelihood by a number of dimensions of the scale that the likelihood is determined for. This way each scale contributes equally to the likelihood. This means higher-resolution scales with more dimensions will contribute more to the sum.

Preferable, a pixel defines at least one intensity value, wherein the digital representation is defined by a set of said pixel, wherein the method comprises determining the first decomposed representation of the first plurality of decomposed representations depending on an average intensity value, wherein the average intensity value is determined by averaging intensity values of non-overlapping sub-sets of the set of pixel, and determining at least one of the at least one second decomposed representations depending on a difference between the intensity values of at least two different of said pixel. The pixels in this aspect are grouped in blocks of pixels for averaging, e.g. in a Haar wavelet decomposition for determining the first decomposed representation at this level.

In another aspect of the present invention, a pixel defines at least one intensity value, wherein the first decomposed representation of the first plurality of decomposed representations is defined by a set of said pixel, wherein the method comprises determining the first decomposed representation of the second plurality of decomposed representations depending on an average intensity value, wherein the average intensity value is determined by averaging intensity values of non-overlapping sub-sets of the set of pixel, and determining the at least one second decomposed representations of the second plurality of decomposed representations depending on a difference between the intensity values of at least two different of said pixel. The pixels in this aspect are also grouped in blocks of pixels for averaging, e.g. in a Haar wavelet decomposition, for determining the first decomposed representation at this level.

In another aspect of the present invention, a pixel defines at least one intensity value, wherein the first decomposed representation of the second plurality of decomposed representations is defined by a set of said pixel, wherein the method comprises determining the first decomposed representation of the third plurality of decomposed representations depending on an average intensity value, wherein the average intensity value is determined by averaging intensity values of non-overlapping sub-sets of the set of pixel, and determining the at least one second decomposed representations of the third plurality of decomposed representations depending on a difference between the intensity values of at least two different of said pixel. The pixels in this aspect are also grouped in blocks of pixels for averaging, e.g. in a Haar wavelet decomposition, for determining the first decomposed representation at this level.

The digital representation may comprise grey scale or color channels, wherein the method comprises processing a single channel separately.

In accordance with an example embodiment of the present invention, the method may comprise processing a digital training representation of a signal or image with the wavelet decomposition to generate a first plurality of decomposed training representations, processing a first decomposed training representation of the first plurality of decomposed training representations with the wavelet decomposition to generate a second plurality of decomposed training representations, processing a first decomposed training representation of the second plurality of decomposed training representations with the wavelet decomposition to generate a third plurality of decomposed training representations, determining first training data for the first model comprising the first decomposed training representation of the third plurality of decomposed training representations, determining second training data for the second model comprising the at least one second decomposed training representation of the third plurality of decomposed training representations, determining third training data for the third model comprising the at least one second decomposed training representation of the second plurality of decomposed training representations, determining fourth training data for the fourth model comprising the at least one second decomposed training representation of the first plurality of decomposed training representations. Thus, separate generative models are trained such as an invertible neural network or an autoregressive neural network, for each resolution.

Preferably, the method comprises training the first generative model with the first training data to determine the first likelihood, training the second generative model with the second training data to determine the second likelihood, training the third generative model with the third training data to determine the third likelihood, and/or training the fourth generative model with the fourth training data to determine the fourth likelihood. This distributional method trains each generative model with training data. The generative model learns the distribution of the training data. Anomalous data is then expected to have lower likelihoods than normal data.

In accordance with an example embodiment of the present invention, a device for anomaly detection is provided, wherein the device comprises input for a digital representation, an output for outputting a result of the anomaly detection and a processing arrangement, adapted to execute the steps of the method according to an example embodiment of the present invention.

Further advantageous aspects of the present invention can be derived from the following description and the figures.

DETAILED DESCRIPTION OF EXAMPLE EMBODIMENTS

Figure 1:
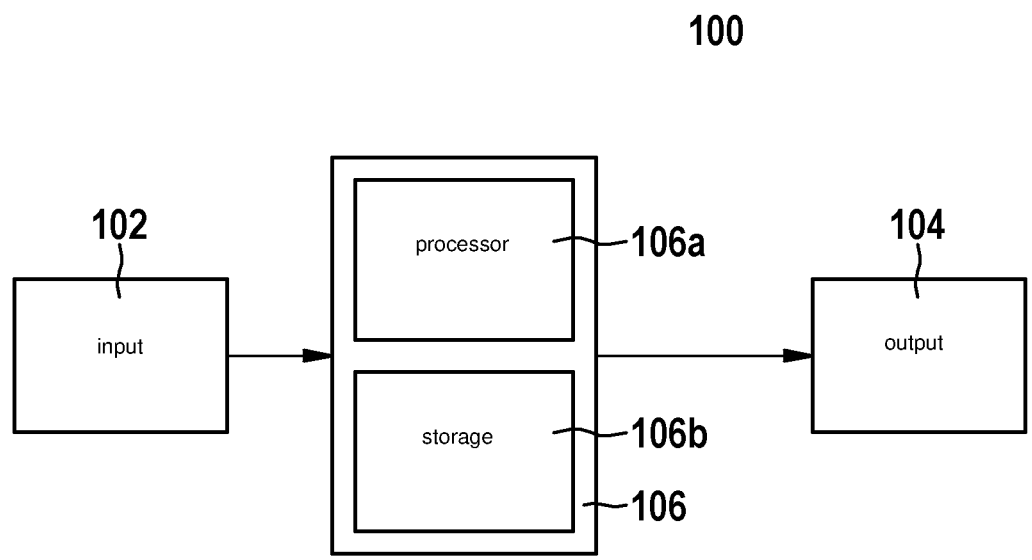
FIG. 1 schematically depicts a device for detecting an anomaly, in accordance with an example embodiment of the present invention.
Figure 2:
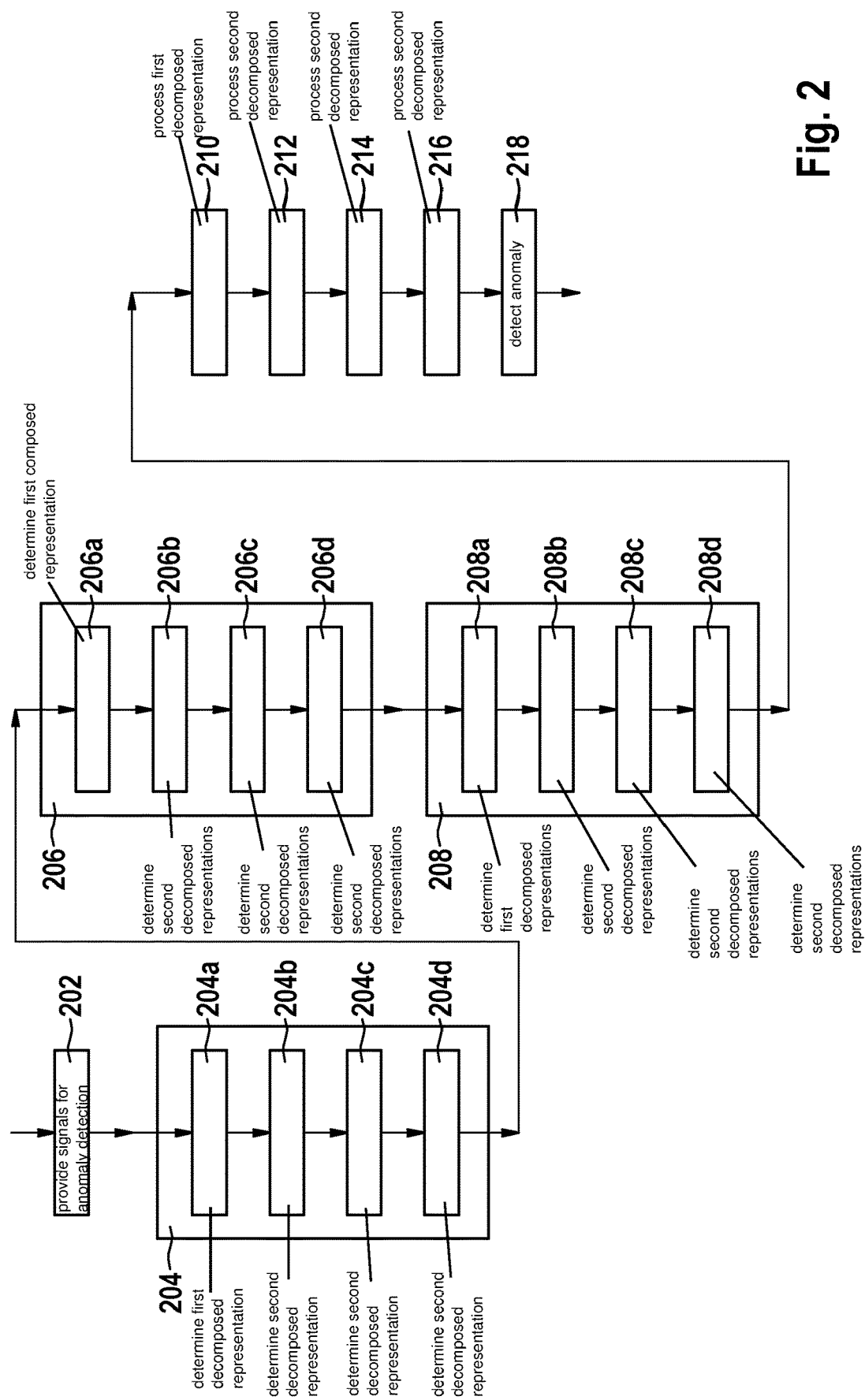
FIG. 2 schematically depicts aspects of a method for detecting an anomaly, in accordance with an example embodiment of the present invention.

FIG. 1 schematically depicts an example device 100 for anomaly detection. The device 100 comprises an input 102 for a digital representation 302, an output 104 for outputting a result of the anomaly detection and a processing arrangement 106 adapted to execute the steps of the method described below referencing FIG. 2. The input 102 may be adapted to receive signals or to provide digital representations. The output may be adapted to output a result of the anomaly detection in a graphical or audible user interface or to send the result of the anomaly detection via a communication path.

The processing arrangement 106 may comprise a processor 106a and a storage 106b for storing instructions, digital representations and/or an output of the anomaly detection.

An example is described below using a digital image as digital representation. However, other input such as audio data may be processed alike. A pixel defines in the example at least one intensity value. The digital representation is defined by a set of said pixels.

The example method uses wavelet decomposition. Wavelets are used in a signal decomposition technique that uses wavelet functions that are translated and scaled across the input to compute wavelet coefficients at different scales and translations or positions.

The method uses generative models. Generative models here mean models that assign likelihoods to data points such that the likelihoods form a proper probability distribution:

$\int_{x \in \Omega} p_\theta(x) = 1$ wherein $\Omega$ is an input domain and $\theta$ are parameters of the generative model.

Examples for a generative model are variation auto encoders, invertible neural networks, normalizing flows or autoregressive methods. They can be trained to maximize a likelihood of a training dataset, typically in log-space:

$$\max_\theta \mathbb{E}_{x \sim P_{train\_data}} \log p_\theta(x)$$

wherein $P_{train\_data}$ is a training data distribution.

Likelihoods obtained from these generative models are used to detect out-of-distribution data, since out-of-distribution data should have low likelihoods. This means, one assumes that $\mathbb{E}_{x \sim P_{train\_data}} \log p_\theta(x) \gg \mathbb{E}_{x \sim P_{different\_data}} \log p_\theta(x)$ wherein $P_{train\_data}$ is the underlying distribution of training data samples that were drawn from, e.g. a distribution of 28×28 grayscale images of handwritten digits for the MNIST data set if you train on MNIST, and $P_{different\_data}$ is some other distribution, e.g., the distribution of 28×28 grayscale images of clothes for FashionMNIST.

To improve the accuracy and reliability of the anomaly detection, the method comprises decomposing signals of a training dataset using Wavelets into different resolution wavelet coefficients, training a separate generative model, such as an invertible neural network or an autoregressive neural network, for each resolution, use likelihoods obtained from these generative models for each scale to determine anomalies: An image must be within the range of likelihoods on the training data in all scales to be considered to be normal.

Figure 3:
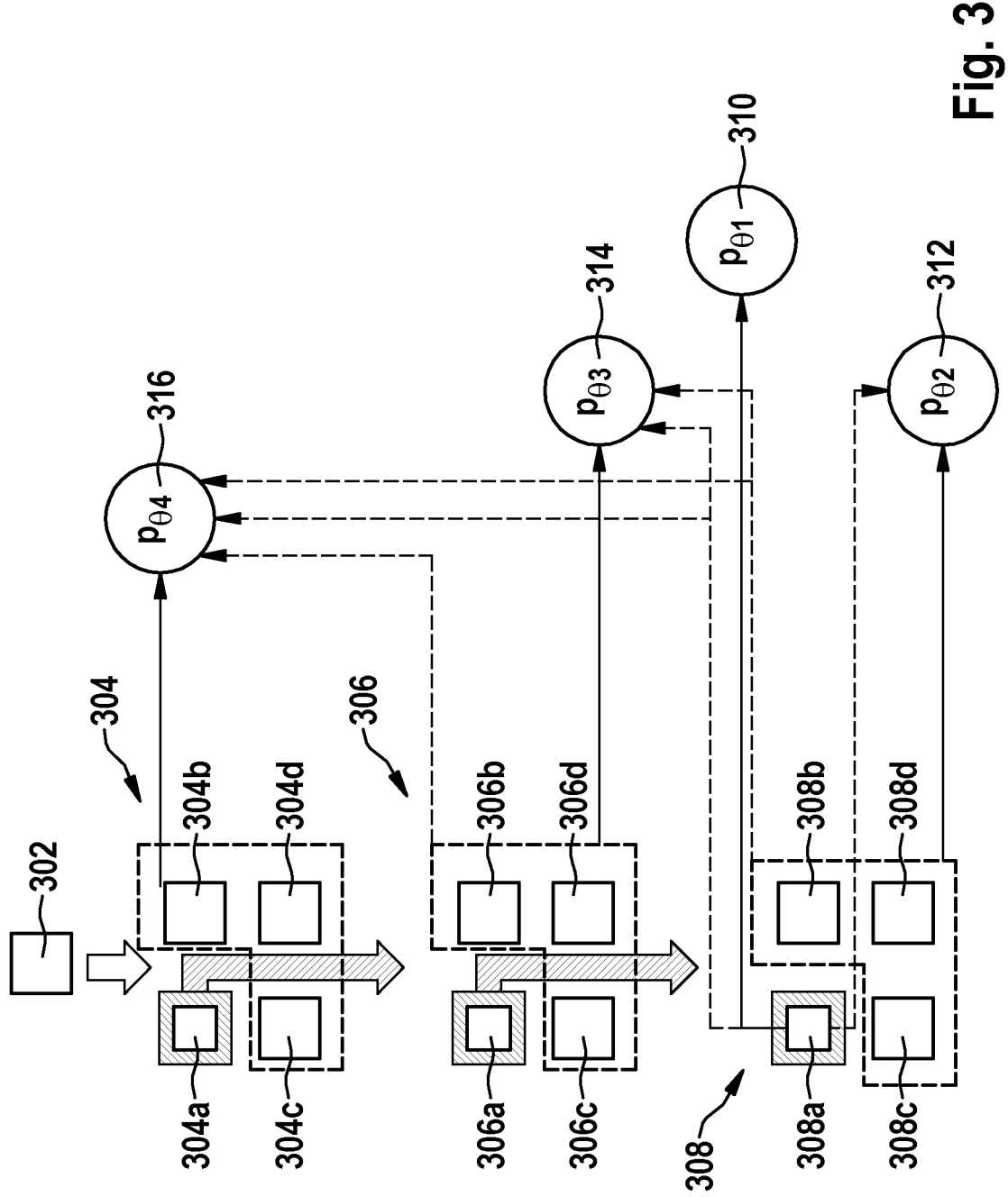
FIG. 3 schematically depicts digital representations for detecting an anomaly, in accordance with an example embodiment of the present invention.

The method comprises a step 202 of providing signals for anomaly detection. The signals are in one aspect provided to the input 102 of the device 100. The signals in the example depicted in FIG. 3 represent a digital representation 302. The digital representation in the example is a digital image of size 32×32 pixel.

The method comprises a step 204 of processing the digital representation 302 of a signal or image with a wavelet decomposition to generate a first plurality of decomposed representations 304. In the example, the digital representation 302 is processed by a Haar Wavelet decomposition to produce a first decomposed representation 304a and at least one second decomposed representation. The wavelet decomposition produces in the example the first decomposed representation 304a and three additional decomposed representations 304b, 304c, 304d. The resolution of these decomposed representations is in the example 16×16 pixel.

The method comprises a step 206 of processing the first decomposed representation 304a of the first plurality of decomposed representations 304 with a wavelet decomposition to generate a second plurality of decomposed representations 306. In the example, the first decomposed representation 304a is processed by the Haar Wavelet decomposition to produce a first decomposed representation 306a and at least one second decomposed representation. The wavelet decomposition produces in the example the first decomposed representation 306a and three additional decomposed representations 306b, 306c, 306d. The resolution of these decomposed representations is in the example 8×8 pixel.

The method comprises a step 208 of processing the first decomposed representation 306a of the second plurality of decomposed representations 306 with a wavelet decomposition to generate a third plurality of decomposed representations 308. In the example, the first decomposed representation 306a is processed by the Haar Wavelet decomposition to produce a first decomposed representation 308a and at least one second decomposed representation. The wavelet decomposition produces in the example the first decomposed representation 308a and three additional decomposed representations 308b, 308c, 308d. The resolution of these decomposed representations is in the example 4×4 pixel.

The method comprises a step 210 of processing the first decomposed representation 308a of the third plurality of decomposed representations 308 with a first generative model 310 to determine a first likelihood $p_{\theta 1}$.

The method comprises a step 212 of processing at least one second decomposed representation 308b, 308c, 308d of the third plurality of decomposed representations 308 with a second generative model 312 to determine a second likelihood $p_{\theta 2}$.

The second generative model 312 may be conditioned on the first decomposed representation 308a of the third plurality of decomposed representations 308.

The method comprises a step 214 of processing at least one second decomposed representation 306b, 306c, 306d of the second plurality of decomposed representations 306 with a third generative model 106 to determine a third likelihood $p_{\theta 3}$.

The third generative model 106 may be conditioned on the first decomposed representation 308a of the third plurality of decomposed representations 308 and conditioned on the at least one second decomposed representation 308b, 308c, 308d of the third plurality of decomposed representations 308.

The third generative model 106 may be conditioned instead on reconstructed representation that is reconstructed from the first decomposed representation 308a of the third plurality of decomposed representations 308 and the at least one second decomposed representation 308b, 308c, 308d by inverse wavelet decomposition. This exactly reconstructs the corresponding averages of the first decomposed representation 306a of the second plurality of decomposed representations 306.

The method comprises a step 216 of processing at least one second decomposed representation 304b, 304c, 304d of the first plurality of decomposed representations 304 with a fourth generative model 316 to determine a fourth likelihood $p_{\theta 4}$.

The fourth generative model 316 may be conditioned on the first decomposed representation 308a of the third plurality of decomposed representations 308, conditioned on the at least one second decomposed representation 308b, 308c, 308d of the third plurality of decomposed representations 308 and conditioned on the at least one second decomposed representation 306b, 306c, 306d of the second plurality of decomposed representations 306.

The fourth generative model 316 may be conditioned instead on a reconstructed representation that is reconstructed from the first decomposed representation 308a of the third plurality of decomposed representations 308, the at least one second decomposed representation 308b, 308c, 308d of the third plurality of decomposed representations 308 and/or the at least one second decomposed representation 306b, 306c, 306d of the second plurality of decomposed representations 306 by at least one inverse wavelet decomposition. This exactly reconstructs the corresponding averages of the first decomposed representation 304a of the first plurality of decomposed representations 304.

Solid lines in FIG. 3 indicate the input to the generative models. Dashed lines in FIG. 3 indicate conditioned inputs to the generative models.

The method comprises a step 218 of detecting an anomaly when at least one of the first likelihood $p_{\theta 1}$, the second likelihood $p_{\theta 2}$, the third likelihood $p_{\theta 3}$ and the fourth likelihood $p_{\theta 4}$ meets a criterion for anomaly detection.

In the example, the first likelihood $p_{\theta 1}$ is compared to a first threshold, the second likelihood $p_{\theta 2}$ is compared to a second threshold, the third likelihood $p_{\theta 3}$ is compared to a third threshold, and the fourth likelihood $p_{\theta 4}$ is compared to a fourth threshold. The thresholds may be set to the same or to different values.

An anomaly may be detected by evaluating whether the first likelihood $p_{\theta 1}$, the second likelihood $p_{\theta 2}$, the third likelihood $p_{\theta 3}$ and the fourth likelihood $p_{\theta 4}$ together meet the criterion. For example a sum is determined depending on the first likelihood $p_{\theta 1}$, the second likelihood $p_{\theta 2}$, the third likelihood $p_{\theta 3}$, and the fourth likelihood $p_{\theta 4}$. The sum is compared to a threshold in a comparison and a normal or an abnormal image is detected depending on the result of the comparison. In the example, the anomaly is detected if the sum exceeds the threshold.

The sum may be a weighted sum of the likelihoods. The weight may be determined depending on the scale or resolution of the representation the likelihood is determined for. For example, the first likelihood $p_{\theta 1}$ is scaled by dividing it by the scale of the first decomposed representation 308a of the third plurality of decomposed representations 308 that was used to determine the first likelihood $p_{\theta 1}$. For example, the second likelihood $p_{\theta 2}$ is scaled by dividing it by the scale of the at least one second decomposed representation 308b, 308c, 308d of the third plurality of decomposed representations 308 that was used to determine the second likelihood $p_{\theta 2}$. For example, the third likelihood $p_{\theta 3}$ is scaled by dividing it by the scale of the at least one second decomposed representation 306b, 306c, 306d of the second plurality of decomposed representations 306 that was used to determine the third likelihood $p_{\theta 3}$. For example, the fourth likelihood $p_{\theta 4}$ is scaled by dividing it by the scale of the at least one second decomposed representation 304b, 304c, 304d of the first plurality of decomposed representations 304 that was used to determine the fourth likelihood $p_{\theta 4}$. The sum is in this example determined by summing up the resulting scaled likelihoods.

In one aspect, when a pixel defines at least one intensity value, the digital representation 302 may be defined by a set of said pixel. The pixels are arranged in a two dimensional matrix having a horizontal extension and a vertical extension, e.g. of 32×32 pixel.

For this aspect, the step 204 may comprise a step 204a of determining the first decomposed representation 304a of the first plurality of decomposed representations 304 depending on an average intensity value. The average intensity value is for example determined by averaging intensity values of non-overlapping sub-sets of the set of pixel of the digital representation 302. In the example a 16×16 pixel image is generated using non overlapping blocks of size 2×2 pixel.

Furthermore, the step 204 may comprise determining at least one of the at least one second decomposed representations 304b, 304c, 304d depending on a difference between the intensity values of at least two different of said pixel.

In the example the step 204 comprises a step 204b of determining the second decomposed representation 304b depending on a difference between the intensity values of pixel for a horizontal extension of the digital representation 302. In the example a 16×16 pixel image is generated.

In the example the step 204 comprises a step 204c of determining the second decomposed representation 304c depending on a difference between the intensity values of pixel for a vertical extension of the digital representation 302. In the example a 16×16 pixel image is generated.

In the example the step 204 comprises a step 204d of determining the second decomposed representation 304d depending on a difference between the intensity values of pixel for a diagonal extension of the digital representation 302. In the example a 16×16 pixel image is generated.

Furthermore the step 206 may comprise a step 206a of determining the first decomposed representation 306a of the second plurality of decomposed representations 306 depending on an average intensity value. The average intensity value is for example determined by averaging intensity values of non-overlapping sub-sets of the set of pixel of the first decomposed representation 304a. In the example a 8×8 pixel image is generated using non overlapping blocks of size 2×2 pixel.

The step 206 may comprise determining the at least one second decomposed representations 306b, 306c, 306d of the second plurality of decomposed representations 306 depending on a difference between the intensity values of at least two different of said pixel of the first decomposed representation 304a.

In the example, the step 206 comprises a step 206b of determining the at least one second decomposed representations 306b of the second plurality of decomposed representations 306 depending on difference between the intensity values of pixel for a horizontal extension of the first decomposed representation 304a. In the example a 8×8 pixel image is generated.

In the example, the step 206 comprises a step 206c of determining the at least one second decomposed representations 306c of the second plurality of decomposed representations 306 depending on difference between the intensity values of pixel for a horizontal extension of the first decomposed representation 304a. In the example a 8×8 pixel image is generated.

In the example, the step 206 comprises a step 206d of determining the at least one second decomposed representations 306d of the second plurality of decomposed representations 306 depending on difference between the intensity values of pixel for a horizontal extension of the first decomposed representation 304a. In the example a 8×8 pixel image is generated.

Furthermore the step 208 may comprise a step 208a of determining the first decomposed representation 308a of the second plurality of decomposed representations 308 depending on an average intensity value. The average intensity value is for example determined by averaging intensity values of non-overlapping sub-sets of the set of pixel of the first decomposed representation 306a. In the example a 4×4 pixel image is generated using non overlapping blocks of size 2×2 pixel.

The step 208 may comprise determining the at least one second decomposed representations 308b, 308c, 308d of the second plurality of decomposed representations 308 depending on a difference between the intensity values of at least two different of said pixel of the first decomposed representation 306a.

In the example, the step 208 comprises a step 208b of determining the at least one second decomposed representations 308b of the second plurality of decomposed representations 308 depending on difference between the intensity values of pixel for a horizontal extension of the first decomposed representation 306a. In the example a 4×4 pixel image is generated.

In the example, the step 208 comprises a step 208c of determining the at least one second decomposed representations 308c of the second plurality of decomposed representations 308 depending on difference between the intensity values of pixel for a horizontal extension of the first decomposed representation 306a. In the example a 4×4 pixel image is generated.

In the example, the step 208 comprises a step 208d of determining the at least one second decomposed representations 308d of the second plurality of decomposed representations 308 depending on difference between the intensity values of pixel for a horizontal extension of the first decomposed representation 306a. In the example a 4×4 pixel image is generated.

The digital representation 302 may comprise a grey scale or color channels for the pixel. In this aspect, the method comprises concatenating these channels into an input and processing this input according to the steps described above. The anomaly is in this example detected in case an anomaly is detected for the input comprising all of the channels. The wavelet decomposition is in the example performed on channel basis, i.e. independently per channel. Then the result of the wavelet decomposition, i.e. the wavelet coefficients, are concatenated along channel dimension for the generative model. The generative model is in this example trained jointly for all channel.

Figure 4:
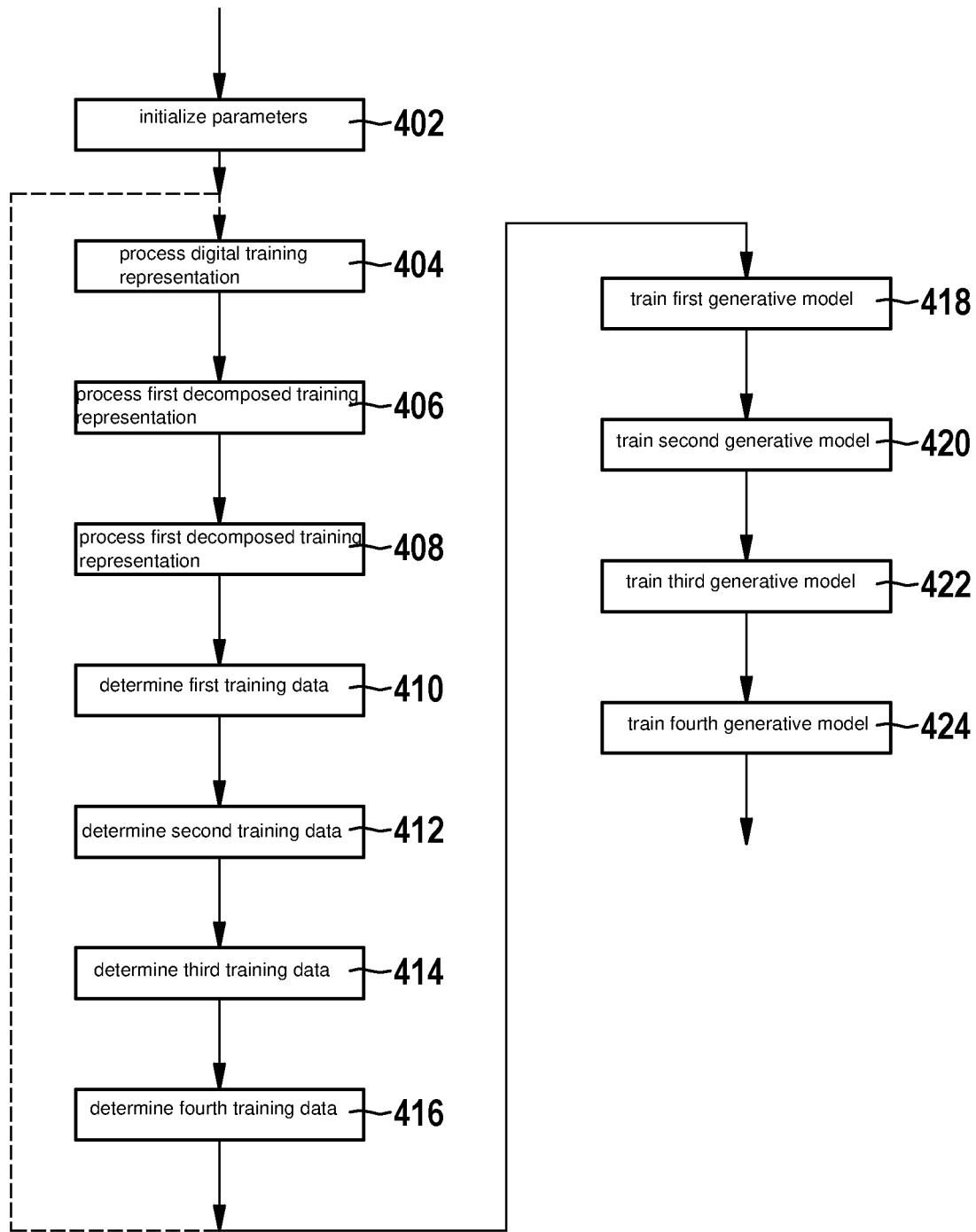
FIG. 4 schematically depicts steps in a method for training generative models for detecting an anomaly, in accordance with an example embodiment of the present invention.

An example method for training the models is described with reference to FIG. 4. The method for training may be executed before using the models. In this aspect, the generative first model 310, the generative second model 312, the generative third model 314 and/or the generative fourth model 316 may be trained as described below and then uses in the method described above.

The method for training comprises a step 402 of initializing the parameters of the generative first model 310, the generative second model 312, the generative third model 314 and/or the generative fourth model 316 e.g. randomly.

Afterwards, in a step 404, a digital training representation of a signal or image is processed with the wavelet decomposition to generate a first plurality of decomposed training representations. The processing is for example the same as described for step 204 above. Steps 204a, 204b, 204c and 204d may be executed as well.

Afterwards, in a step 406 a first decomposed training representation of the first plurality of decomposed training representations 304 is processed with the wavelet decomposition to generate a second plurality of decomposed training representations. The processing is for example the same as described for step 206 above. Steps 206a, 206b, 206c and 206d may be executed as well.

Afterwards, in a step 408, a first decomposed training representation of the second plurality of decomposed training representations is processed with the wavelet decomposition to generate a third plurality of decomposed training representations. The processing is for example the same as described for step 208 above. Steps 208a, 208b, 208c and 208d may be executed as well.

Afterwards the method comprises a step 410 of determining first training data for the first model 310 comprising the first decomposed training representation of the third plurality of decomposed training representations.

Afterwards the method comprises a step 412 of determining second training data for the second model 312 comprising the at least one second decomposed training representation of the third plurality of decomposed training representations.

Afterwards the method comprises a step 414 of determining third training data for the third model 314 comprising the at least one second decomposed training representation of the second plurality of decomposed training representations.

Afterwards the method comprises a step 416 of determining fourth training data for the fourth model 316 comprising the at least one second decomposed training representation of the first plurality of decomposed training representations.

The steps 404 to 416 may be repeated for a plurality of digital training representations.

Afterwards the method comprises a step 418 of training the first generative model 310 with the first training data to determine the first likelihood $p_{\theta 1}$.

Afterwards the method comprises a step 420 of training the second generative model 312 with the second training data to determine the second likelihood $p_{\theta 2}$.

Afterwards the method comprises a step 422 of training the third generative model 314 with the third training data to determine the third likelihood $p_{\theta 3}$.

Afterwards the method comprises a step 424 of training the fourth generative model 316 with the fourth training data to determine the fourth likelihood $p_{\theta 4}$.

Afterwards optionally the step 202 of the method described above is executed to perform abnormality detection with the so trained generative models.

What is claimed is:

1. A computer implemented method of anomaly detection, comprising the following steps:
processing a digital representation of a signal or image with a wavelet decomposition to generate a first plurality of decomposed representations;
processing a first decomposed representation of the first plurality of decomposed representations with a wavelet decomposition to generate a second plurality of decomposed representations;
processing a first decomposed representation of the second plurality of decomposed representations with a wavelet decomposition to generate a third plurality of decomposed representations;
processing a first decomposed representation of the third plurality of decomposed representations with a first generative model to determine a first likelihood;

processing at least one second decomposed representation of the third plurality of decomposed representations with a second generative model to determine a second likelihood;

processing at least one second decomposed representation of the second plurality of decomposed representations with a third generative model to determine a third likelihood;

processing at least one second decomposed representation of the first plurality of decomposed representations with a fourth generative model to determine a fourth likelihood; and detecting an anomaly when a criterium for anomaly detection is met by at least one of: the first likelihood, the second likelihood, the third likelihood, and the fourth likelihood;

wherein the method includes at least one of the following features (a)-(f):
(a) the digital representation is composed of a two-dimensional set of data, and at least one of:
  (i) each of the decomposed representations is of a resolution that is reduced compared to a resolution of the representation from which the respective decomposed representation has been decomposed by a division of the resolution of the representation from which the respective decomposed representation has been decomposed with a factor of four; and
  (ii) each of the decompositions increases a number of the representations by a multiple of four;
(b) each of the likelihoods is a respective indication of a likelihood of a plurality of data points of the respective one or more of the decomposed representations for which the respective likelihood has been determined;
(c) each of at least one of the second, third, and fourth generative models is conditioned on at least one of the decomposed representations other than the respective representations used by the respective one of the second, third, and fourth generative models for the respective likelihood determination;
(d) the detecting of the anomaly includes determining a sum depending on the first likelihood, the second likelihood, the third likelihood, and the fourth likelihood, comparing the sum to a threshold in a comparison, and determining whether the anomaly is present depending on a result of the comparison;
(e) each pixel of a plurality of pixels defines at least one intensity value, and at least one of:
  (i) the digital representation is defined by a set of the pixels, and the method comprises:
    determining the first decomposed representation of the first plurality of decomposed representations depending on an average intensity value obtained by averaging intensity values of non-overlapping subsets of the set of pixels; and
    determining at least one of the at least one second decomposed representation of the first plurality of decomposed representations depending on a difference between the intensity values of at least two different ones of the pixels;
  (ii) the first decomposed representation of the first plurality of decomposed representations is defined by a set of the pixels, and the method comprises:
    determining the first decomposed representation of the second plurality of decomposed representations depending on an average intensity value obtained by averaging intensity values of non-overlapping subsets of the set of pixels; and
    determining the at least one second decomposed representation of the second plurality of decomposed representations depending on a difference between the intensity values of at least two different ones of the pixels; and
  (iii) the first decomposed representation of the second plurality of decomposed representations is defined by a set of the pixels, and the method further comprises:
    determining the first decomposed representation of the third plurality of decomposed representations depending on an average intensity value obtained by averaging intensity values of non-overlapping subsets of the set of pixels; and
    determining the at least one second decomposed representation of the third plurality of decomposed representations depending on a difference between the intensity values of at least two different ones of the pixels; and
(f) the method further comprises:
  processing a digital training representation of a signal or image with the wavelet decomposition to generate a first plurality of decomposed training representations;
  processing a first decomposed training representation of the first plurality of decomposed training representations with the wavelet decomposition to generate a second plurality of decomposed training representations;
  processing a first decomposed training representation of the second plurality of decomposed training representations with the wavelet decomposition to generate a third plurality of decomposed training representations;
  determining first training data for the first generative model including a first decomposed training representation of the third plurality of decomposed training representations;
  determining second training data for the second generative model including at least one second decomposed training representation of the third plurality of decomposed training representations;
  determining third training data for the third generative model including at least one second decomposed training representation of the second plurality of decomposed training representations; and
  determining fourth training data for the fourth generative model including at least one second decomposed training representation of the first plurality of decomposed training representations.

2. The method according to claim 1, wherein:
(i) the second generative model is conditioned on the first decomposed representation of the third plurality of decomposed representations and/or
(ii) the third generative model is either conditioned on the first decomposed representation of the third plurality of decomposed representations and on the at least one second decomposed representation of the third plurality of decomposed representations, or is conditioned on a reconstructed representation that is reconstructed from the first decomposed representation of the third plurality of decomposed representations and the at least one second decomposed representation, by inverse wavelet decomposition, and/or (iii) the fourth generative model is either conditioned on the first decomposed representation of the third plurality of decomposed representations, the at least one second decomposed representation of the third plurality of decomposed representations and the at least one second decomposed representation of the second plurality of decomposed representations, or is conditioned on a reconstructed representation that is reconstructed from the first decomposed representation of the third plurality of decomposed representations, the at least one second decomposed representation of the third plurality of decomposed representations and/or the at least one second decomposed representation of the second plurality of decomposed representations, by at least one inverse wavelet decomposition.

3. The method according to claim 1, wherein the criterion is met when at least one of the first likelihood, the second likelihood, the third likelihood, and the fourth likelihood is below a threshold.

4. The method according to claim 3, further comprising: comparing the first likelihood to a first threshold; comparing the second likelihood to a second threshold; comparing the third likelihood to a third threshold; and comparing the fourth likelihood to a fourth threshold.

5. The method according to claim 1, wherein the detecting of the anomaly includes the determining of the sum depending on the first likelihood, the second likelihood, the third likelihood, and the fourth likelihood, comparing the sum to threshold in the comparison, and determining whether the anomaly is present depending on the result of the comparison.

6. The method according to claim 1, wherein each pixel of the plurality of pixels defines the at least one intensity value, the digital representation is defined by the set of the pixels, and the method comprises:
  determining the first decomposed representation of the first plurality of decomposed representations depending on the average intensity value obtained by the averaging of the intensity values of the non-overlapping subsets of the set of pixels; and
  determining the at least one of the at least one second decomposed representation of the first plurality of decomposed representations depending on the difference between the intensity values of at least two different ones of the pixels.

7. The method according to claim 1, wherein each pixel of the plurality of pixels defines the at least one intensity value, the first decomposed representation of the first plurality of decomposed representations is defined by the set of the pixels, and the method comprises:
  determining the first decomposed representation of the second plurality of decomposed representations depending on the average intensity value obtained by the averaging of the intensity values of the non-overlapping subsets of the set of pixels; and
  determining the at least one second decomposed representation of the second plurality of decomposed representations depending on the difference between the intensity values of at least two different ones of the pixels.

8. The method according to claim 1, wherein each pixel of the plurality of pixels defines the at least one intensity value, the first decomposed representation of the second plurality of decomposed representations is defined by the set of the pixels, and the method comprises:
  determining the first decomposed representation of the third plurality of decomposed representations depending on the average intensity value obtained by the averaging of the intensity values of the non-overlapping subsets of the set of pixels; and
  determining the at least one second decomposed representation of the third plurality of decomposed representations depending on the difference between the intensity values of at least two different ones of the pixels.

9. The method according to claim 1, wherein the digital representation includes grey scale or color channels, and wherein the method comprises processing each single channel of the channels separately.

10. The method according to claim 1, further comprising:
  processing the digital training representation with the wavelet decomposition to generate the first plurality of decomposed training representations;
  processing the first decomposed training representation of the first plurality of decomposed training representations with the wavelet decomposition to generate the second plurality of decomposed training representations;
  processing the first decomposed training representation of the second plurality of decomposed training representations with the wavelet decomposition to generate the third plurality of decomposed training representations;
  determining the first training data for the first generative model including the first decomposed training representation of the third plurality of decomposed training representations;
  determining the second training data for the second generative model including the at least one second decomposed training representation of the third plurality of decomposed training representations;
  determining the third training data for the third generative model including the at least one second decomposed training representation of the second plurality of decomposed training representations; and
  determining the fourth training data for the fourth generative model including the at least one second decomposed training representation of the first plurality of decomposed training representations.

11. The method according to claim 10, further comprising:
  training the first generative model with the first training data to determine the first likelihood, and/or
  training the second generative model with the second training data to determine the second likelihood, and/or
  training the third generative model with the third training data to determine the third likelihood, and/or
  training the fourth generative model with the fourth training data to determine the fourth likelihood.

12. The method according to claim 1, wherein the digital representation is composed of the two-dimensional set of data, and each of the decomposed representations is of the resolution that is reduced compared to the resolution of the representation from which the respective decomposed representation has been decomposed by the division of the resolution of the representation from which the respective decomposed representation has been decomposed with the factor of four.

13. The method according to claim 1, wherein the digital representation is composed of the two-dimensional set of data, and each of the decompositions increases the number of the representations by the multiple of four.

14. The method according to claim 1, wherein each of the likelihoods is the respective indication of the likelihood of the plurality of data points of the respective one or more of the decomposed representations for which the respective likelihood has been determined.

15. The method according to claim 14, wherein the likelihoods form a predefined probability distribution.

16. The method according to claim 1, wherein each of the at least one of the second, third, and fourth generative models is conditioned on the at least one of the decomposed representations other than the respective representations used by the respective one of the second, third, and fourth generative models for the respective likelihood determination.

17. A device for anomaly detection, the device comprising:
   a processor, wherein:
      the processor is configured to:
         process a digital representation of a signal or image with a wavelet decomposition to generate a first plurality of decomposed representations;
         process a first decomposed representation of the first plurality of decomposed representations with a wavelet decomposition to generate a second plurality of decomposed representations;
         process a first decomposed representation of the second plurality of decomposed representations with a wavelet decomposition to generate a third plurality of decomposed representations;
         process a first decomposed representation of the third plurality of decomposed representations with a first generative model to determine a first likelihood;
         process at least one second decomposed representation of the third plurality of decomposed representations with a second generative model to determine a second likelihood;
         process at least one second decomposed representation of the second plurality of decomposed representations with a third generative model to determine a third likelihood;
         process at least one second decomposed representation of the first plurality of decomposed representations with a fourth generative model to determine a fourth likelihood; and
         detect an anomaly when a criterium for anomaly detection is met by at least one of: the first likelihood, the second likelihood, the third likelihood, and the fourth likelihood; and
   the device includes at least one of the following features (a)-(f):
      (a) the digital representation is composed of a two-dimensional set of data, and at least one of:
         (i) each of the decomposed representations is of a resolution that is reduced compared to a resolution of the representation from which the respective decomposed representation has been decomposed by a division of the resolution of the representation from which the respective decomposed representation has been decomposed with a factor of four; and
         (ii) each of the decompositions increases a number of the representations by a multiple of four;
      (b) each of the likelihoods is a respective indication of a likelihood of a plurality of data points of the respective one or more of the decomposed representations for which the respective likelihood has been determined;
      (c) each of at least one of the second, third, and fourth generative models is conditioned on at least one of the decomposed representations other than the respective representations used by the respective one of the second, third, and fourth generative models for the respective likelihood determination;
      (d) the detecting of the anomaly includes determining a sum depending on the first likelihood, the second likelihood, the third likelihood, and the fourth likelihood, comparing the sum to a threshold in a comparison, and determining whether the anomaly is present depending on a result of the comparison;
      (e) each pixel of a plurality of pixels defines at least one intensity value, and at least one of:
         (i) the digital representation is defined by a set of the pixels, and the processor is configured to:
            determine the first decomposed representation of the first plurality of decomposed representations depending on an average intensity value obtained by averaging intensity values of non-overlapping subsets of the set of pixels; and
            determine at least one of the at least one second decomposed representation of the first plurality of decomposed representations depending on a difference between the intensity values of at least two different ones of the pixels;
         (ii) the first decomposed representation of the first plurality of decomposed representations is defined by a set of the pixels, and the processor is configured to:
            determine the first decomposed representation of the second plurality of decomposed representations depending on an average intensity value obtained by averaging intensity values of non-overlapping subsets of the set of pixels; and
            determine the at least one second decomposed representation of the second plurality of decomposed representations depending on a difference between the intensity values of at least two different ones of the pixels; and
         (iii) the first decomposed representation of the second plurality of decomposed representations is defined by a set of the pixels, and the processor is configured to:
            determine the first decomposed representation of the third plurality of decomposed representations depending on an average intensity value obtained by averaging intensity values of non-overlapping subsets of the set of pixels; and
            determining the at least one second decomposed representation of the third plurality of decomposed representations depending on a difference between the intensity values of at least two different ones of the pixels; and
      (f) the processor is configured to:
         process a digital training representation of a signal or image with the wavelet decomposition to generate a first plurality of decomposed training representations;
         process a first decomposed training representation of the first plurality of decomposed training representations with the wavelet decomposition to generate a second plurality of decomposed training representations;
         process a first decomposed training representation of the second plurality of decomposed training representations with the wavelet decomposition to generate a third plurality of decomposed training representations;

determine first training data for the first generative model including a first decomposed training representation of the third plurality of decomposed training representations;

determine second training data for the second generative model including at least one second decomposed training representation of the third plurality of decomposed training representations;

determine third training data for the third generative model including at least one second decomposed training representation of the second plurality of decomposed training representations; and determine fourth training data for the fourth generative model including at least one second decomposed training representation of the first plurality of decomposed training representations.

18. A non-transitory computer readable storage medium on which is stored a computer program for anomaly detection, the computer program, when executed by a computer, causing the computer to perform a method that comprises the following steps:

processing a digital representation of a signal or image with a wavelet decomposition to generate a first plurality of decomposed representations;

processing a first decomposed representation of the first plurality of decomposed representations with a wavelet decomposition to generate a second plurality of decomposed representations;

processing a first decomposed representation of the second plurality of decomposed representations with a wavelet decomposition to generate a third plurality of decomposed representations;

processing a first decomposed representation of the third plurality of decomposed representations with a first generative model to determine a first likelihood;

processing at least one second decomposed representation of the third plurality of decomposed representations with a second generative model to determine a second likelihood;

processing at least one second decomposed representation of the second plurality of decomposed representations with a third generative model to determine a third likelihood;

processing at least one second decomposed representation of the first plurality of decomposed representations with a fourth generative model to determine a fourth likelihood; and detecting an anomaly when a criterium for anomaly detection is met by at least one of: the first likelihood, the second likelihood, the third likelihood, and the fourth likelihood;

wherein the method includes at least one of the following features (a)-(f):

(a) the digital representation is composed of a two-dimensional set of data, and at least one of:
  (i) each of the decomposed representations is of a resolution that is reduced compared to a resolution of the representation from which the respective decomposed representation has been decomposed by a division of the resolution of the representation from which the respective decomposed representation has been decomposed with a factor of four; and
  (ii) each of the decompositions increases a number of the representations by a multiple of four;

(b) each of the likelihoods is a respective indication of a likelihood of a plurality of data points of the respective one or more of the decomposed representations for which the respective likelihood has been determined;

(c) each of at least one of the second, third, and fourth generative models is conditioned on at least one of the decomposed representations other than the respective representations used by the respective one of the second, third, and fourth generative models for the respective likelihood determination;

(d) the detecting of the anomaly includes determining a sum depending on the first likelihood, the second likelihood, the third likelihood, and the fourth likelihood, comparing the sum to a threshold in a comparison, and determining whether the anomaly is present depending on a result of the comparison;

(e) each pixel of a plurality of pixels defines at least one intensity value, and at least one of:
  (i) the digital representation is defined by a set of the pixels, and the method comprises:
    determining the first decomposed representation of the first plurality of decomposed representations depending on an average intensity value obtained by averaging intensity values of non-overlapping subsets of the set of pixels; and
    determining at least one of the at least one second decomposed representation of the first plurality of decomposed representations depending on a difference between the intensity values of at least two different ones of the pixels;
  (ii) the first decomposed representation of the first plurality of decomposed representations is defined by a set of the pixels, and the method comprises:
    determining the first decomposed representation of the second plurality of decomposed representations depending on an average intensity value obtained by averaging intensity values of non-overlapping subsets of the set of pixels; and
    determining the at least one second decomposed representation of the second plurality of decomposed representations depending on a difference between the intensity values of at least two different ones of the pixels; and
  (iii) the first decomposed representation of the second plurality of decomposed representations is defined by a set of the pixels, and the method further comprises:
    determining the first decomposed representation of the third plurality of decomposed representations depending on an average intensity value obtained by averaging intensity values of non-overlapping subsets of the set of pixels; and
    determining the at least one second decomposed representation of the third plurality of decomposed representations depending on a difference between the intensity values of at least two different ones of the pixels; and (f) the method further comprises:
  processing a digital training representation of a signal or image with the wavelet decomposition to generate a first plurality of decomposed training representations;
  processing a first decomposed training representation of the first plurality of decomposed training representations with the wavelet decomposition to generate a second plurality of decomposed training representations;

processing a first decomposed training representation of the second plurality of decomposed training representations with the wavelet decomposition to generate a third plurality of decomposed training representations;
determining first training data for the first generative model including a first decomposed training representation of the third plurality of decomposed training representations;
determining second training data for the second generative model including at least one second decomposed training representation of the third plurality of decomposed training representations;
determining third training data for the third generative model including at least one second decomposed training representation of the second plurality of decomposed training representations; and
determining fourth training data for the fourth generative model including at least one second decomposed training representation of the first plurality of decomposed training representations.

\* \* \* \* \*